Sept. 28, 1943. H. P. MIXER Re. 22,381

ACCOUNTING MACHINE

Original Filed April 25, 1936 4 Sheets-Sheet 1

INVENTOR
HAROLD P. MIXER

BY J. L. Stuhlmann

ATTORNEY

Sept. 28, 1943.

H. P. MIXER

Re. 22,381

ACCOUNTING MACHINE

Original Filed April 25, 1936 4 Sheets-Sheet 2

INVENTOR
HAROLD P. MIXER

BY John L. Sterling

ATTORNEY

Sept. 28, 1943. H. P. MIXER Re. 22,381

ACCOUNTING MACHINE

Original Filed April 25, 1936 4 Sheets-Sheet 3

INVENTOR
HAROLD P. MIXER

BY J. L. Sterling

ATTORNEY

Sept. 28, 1943. H. P. MIXER Re. 22,381

ACCOUNTING MACHINE

Original Filed April 25, 1936 4 Sheets-Sheet 4

INVENTOR
HAROLD P. MIXER

BY J. L. Stirling

ATTORNEY

Reissued Sept. 28, 1943

Re. 22,381

UNITED STATES PATENT OFFICE 22,381

ACCOUNTING MACHINE

Harold P. Mixer, Rockville Centre, N. Y., assignor to Remington Rand, Inc., Buffalo, N. Y., a corporation of Delaware Original No. 2,311,454, dated February 16, 1943, Serial No. 335,214, May 15, 1940, which is a division of Serial No. 76,492, April 25, 1936, now Patent No. 2,214,029, dated September 10, 1940. Application for reissue July 3, 1943, Serial No. 493,485

3 Claims. (Cl. 235—144)

This is a reissue of my Patent No. 2,311,454, which was granted February 16, 1943 on an application filed May 15, 1940, Serial No. 335,214; and said application was itself a division of my prior application filed April 25, 1936, Serial No. 76,492, now Patent No. 2,214,029, dated September 10, 1940.

The invention more particularly relates to accumulating mechanisms of the creep or crawl-carry type and means for zeroizing the accumulator wheels. These accumulating mechanisms may be used as part of a number of accounting machines used for various purposes, the present use being confined to a multiplying machine fully described in the parent application. This multiplying machine, generally speaking, comprises a sensing mechanism, a multiplication mechanism, a totaling mechanism, punching mechanism, and coordinated driving means for the various elements mentioned.

The invention has for its principal object to reduce the time required for zeroizing the accumulator. The mechanism is so organized that a small amount of rotation toward the zero position of a wheel of a lower denominational order permits the release of the wheel of next higher denominational order for rotation toward its zero stop.

A more clear conception of the further objects, construction, and operation of the invention may be had from the following detailed description when taken in conjunction with the accompanying drawings, in which Fig. 1 is an isometric view of the combined accumulating mechanism and the zeroizing mechanism;

Figure 1:
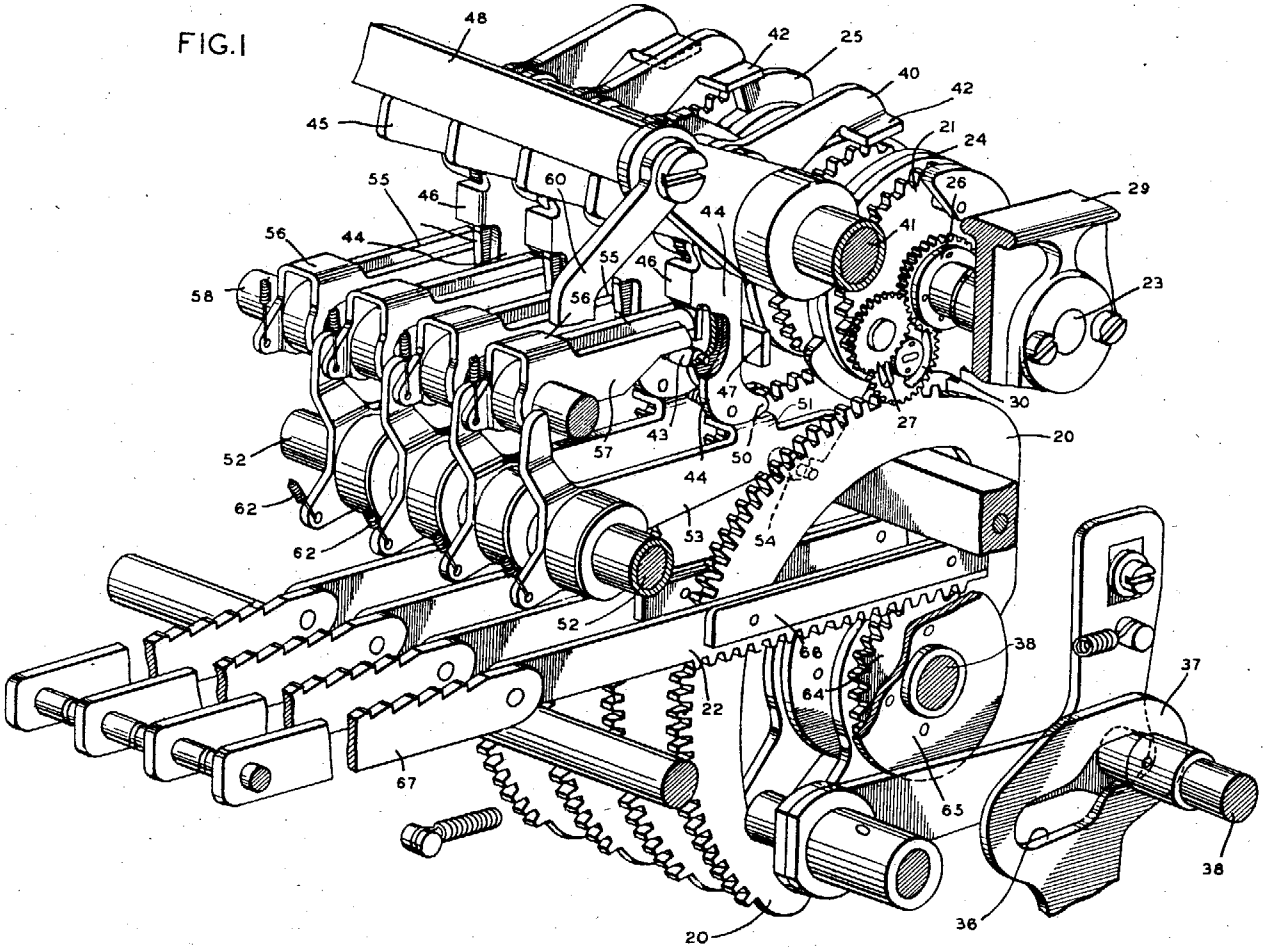

The type of accumulator disclosed in this specification is commonly known as the crawl-carry, as distinguished from the snap-carry type of mechanism in which transfer of tens occurs subsequent to the accumulation operation. In the crawl-carry type, the transfer of tens is continuous and is ordinarily caused by some form of step-down gearing. A common example of the crawl-carry is shown in the United States patent to Gardner, No. 1,828,180.

In the mechanism of the above patent the transfer is effected through the medium of an eccentrically mounted gear and in taking totals from this mechanism it is necessary that the wheel of the lowest denominational order be positioned against its zero stop before the wheel of the next higher denominational order is released.

In the form of crawl-carry totalizer shown in this application, the carry is through the medium of a train of planetary spur gears which facilitates a faster zeroizing operation.

In the present mechanism, in a zeroizing operation, the spring-impelled actuators for the accumulator gears, except that of lowest order, are initially restrained by certain locking devices each of which is tripped or released under control of the accumulator wheel of next lower order. The release of each lock follows immediately on the release of that of next lower order except when a wheel registers nine, so that, when the total includes no nines, the accumulator actuators are released not far from simultaneously. When a wheel registers nine, the release of the next higher actuator is delayed only until said wheel reaches about its eight position. The stop arms, which arrest the wheels at zero, are also initially held out of engagement and each is released simultaneously with the release of the associate actuator. Each said stop arm is, therefore, never released while the next lower wheel registers nine. It will be obvious that, if all wheels had nines registered thereon, the higher order wheels would, due to the creep or crawl, stand very near the zero point, and that, when the stop arm was lowered into the path of the stop, it might, and probably would, stop it at once rather than after turning nine spaces.

The accumulating mechanism comprises a plurality of accumulator units, together with certain latches for governing their operation. The gears which operate the accumulator units are not indicated in the drawing, (except in Fig. 2) since they do not form a part of the present invention. Any gear or sector driven by a calculating mechanism may operate the accumulator units since there is no restriction on timing or phase of operation. In addition to the operating gears which roll numbers into the accumulator units there is provided in the present instance a series of sectors 20 (Fig. 1) which, though normally out of mesh, may be brought into mesh with the accumulator gears 21 to operate racks 22 or other means for recording or printing the total.

The accumulator gears 21 are shown in detail in Figs. 1, 2, 4, and 5, and these wheels together with other accumulator parts are mounted on a common shaft 23 which extends the entire width of the machine and is attached to side frames 77.

Each accumulator unit (Figs. 1, 2, 4, 5, 6, and 7) comprises the accumulator gear 21, accumulator wheel 24, together with an integral lug 25 and a train of planetary gearing including a sun gear 26, planet gears 27, 28, 30, 31, and an orbit gear 32.

In an accumulator unit for the lowest denomination order the sun gear 26 is fixed, while in each of the other units the sun gear is fastened to the accumulator wheel 24, and orbit gear 32 of the next lower order.

The accumulator gear 21 (Fig. 2) has thirty-six teeth and is designed to mesh with driving gear 35 which has forty teeth; the exact number of teeth is unimportant, it being necessary only that the ratio of 9 to 10 be maintained.

Fixed to each accumulator gear 21 (Fig. 4) is a stud 33 on which are mounted the gears 27 and 28 which gears are mounted together and rotatably mounted on the stud. Rotatably mounted in and extending through the accumulator gear 21 is a short shaft 34 on one end of which is fixed the planet gear 30 and on the other the planet gear 31 which meshes with the annular orbit gear 32 which is secured to the accumulator wheel 24.

The tooth ratios of the various gears 26 through 32 are such that one turn of gear 26 will produce one-tenth of a turn of gear 32. In the present instance, gears 26 and 27 have thirty teeth each; gear 28 sixteen teeth; gear 30 thirty teeth; gear 31 twelve teeth; and gear 32 sixty-four teeth.

As has been explained above when a digit is to be registered in the accumulator, the drive gear 35 is rotated by external means one tenth of a full revolution for each unit to be accumulated.

Due to the gear ratio set forth above the rotation of an accumulator drive gear 35 causes its associated accumulator gear to be driven one and one-ninth times as far. Thus, if the digit to be registered is assumed to be "9" the accumulator gear 21 will be driven one and one-ninth times nine-tenths of a complete turn; if "8" then one and one-ninth times eight-tenths, or eight-ninths of a complete turn; and if "1" then one and one-ninth times one-tenth or one-ninth of a complete turn.

The rotation of the accumulator gear 21 rotates the associated accumulator wheel 24 and its integral stop 25 until the stop is properly positioned. The rotation of the accumulator wheel may be considered as the resultant of two separate operations upon it, although actually the two operations occur simultaneously.

One of the component movements of the resultant may be considered as that due to the teeth of planet gear 31 coacting with teeth of orbit gear 32 to pin the two gears together. Due to this component the accumulator wheel 24 will be driven as many ninths of a turn as is the accumulator gear 21, in an additive direction.

The other component movement of the resultant is that due to the action of the planetary gear train. Thus, if we assume the sun gear 26 of the train to be stationary, which is true of the first, or unit gear, then, as the accumulator gear 21 rotates, the planetary gear 27 will roll on the sun gear 26 and will rotate the orbit gear 32 in the opposite or subtractive direction. Now the gear ratios are such that the orbit gear 32 and, therefore, the accumulator wheel 24 tend to rotate one-tenth as much as the accumulator gear 21 in the opposite direction.

The resultant and actual motion of the accumulator wheel 24 for any digit is, then, the motion of the accumulator gear 21 minus one-tenth of that amount. Thus, for a digit "9" the accumulator wheel rotates one turn minus one-tenth of a turn or nine-tenths of a turn; for the digit "8," the wheel rotates eight-ninths of a turn minus eight-ninetieths of a turn, or eight-tenths of a turn and for the digit "1" the accumulator wheel rotates one-ninth of a turn, minus one-ninetieth of a turn, or one-tenth of a turn.

From the above, it will be seen that an accumulator wheel during accumulating operations rotates as many tenths of a turn in an additive direction as the digit registered represents.

In addition to movement imparted to it from the associated accumulator gear 21, each accumulator wheel 24 (except that of the lowest denominational order) has imparted to it movement due to the rotation of the sun gear 26 attached to the accumulator wheel of the next lower denominational order. In this action, the gears 26, 27, 28, 30, 31, and 32 act as ordinary step-down gearing, and serve to rotate each accumulator wheel one-tenth as far in the same direction as the wheel of the next lower order. For example, if the wheel of the lowest or units order were rotated nine-tenths of a turn to register a "nine" and no digits were inserted in the higher order wheels, then the wheel of the tens order would rotate nine one-hundredths of a turn, that of the thousands order nine-one-thousandths, that of the ten thousands order nine ten-thousandths, etc. The movement of any wheel is, then, the sum of the movements imparted to it from its associated accumulator gear and the correct decimals of the movements imparted to all lower order wheels, these decimals being in each case the movement of any wheel divided by ten to that power which represents the degree of removal of the lower order wheel from the higher order, the movement of which is sought.

*Accumulator zeorizing mechanism*

The present calculating machines which employ the herein described accumulator operate in two phases. The first phase stores or accumulates numbers in the accumulator due to the operations of the driving gears 35. These driving gears may be a part of an adding machine, multiplying machine or any other calculating mechanism and said wheels may operate in an additive or subtractive direction. During the first or accumulating phase the sector gears 20 (Fig. 1) are pulled out of mesh with the accumulator gears 21 by any convenient means. Fig. 1 shows a slot cam 36 cut in an arm 37 which positions a shaft 38 on which the sectors 20 are rotatably mounted. Movement of arm 37 causes the sectors to be moved in or out of mesh in accordance with a predetermined schedule of operations which have been fully described and disclosed in the parent application of which this is a division. It should be understood, however, that any mechanism which will shift from the driving gear to the zeroizing or totaling gear may be used with this accumulator.

The present accumulator contemplates a second or total taking phase which comprises the rotation of the accumulator wheels in a reverse direction until the stops 25 (Figs. 1, 2, 6, 7, 9, and 10) thereon strike stop arms 40 located at definite points or until they reach the "zero position." This rotation is effected after the accumulator wheels have been meshed with a series of sectors 20 and the action is caused by a series of springs which urge the ratchet bars 67 toward the front of the machine.

In prior crawl type accumulators, it was customary to mesh all the accumulator gears with the associated toothed elements while those elements were prevented from moving, and to then release the toothed elements one by one progressively from the lowest to the highest order, the mechanism governing the timing of the progression being independent of the stop arms, the interval between successive releases being sufficient for a wheel to travel the maximum amount, namely, from "9" to "0".

The mechanism for releasing the accumulator wheels in order and for delaying such release will now be described.

Pivoted on a rod 41 (Figs. 1, 2, 8, 9, and 10) extending between the carriage side plates (not shown) are a number of control and stop arms 40, one for each accumulator unit. These arms are formed as bell-cranks and each one is provided with a bent-over lug 42 on its substantially horizontal arm and a stud 43 on its vertical arm. Each bent-over lug 42 lies in the same vertical plane as the lug 25 on the accumulator wheel of corresponding denominational order so that, when the arm 40 is rotated clockwise (Fig. 9), the lug 42 lies in the path of the lug 25 on wheel 24 and causes the wheel to stop at its zero position.

Pivoted on the rod 41 (see Fig. 1) adjacent to each arm 40 is a holding member 44 which serves to hold the sector, or other toothed element against movement and also serves to hold the arm 40 of the associated accumulator unit against clockwise rotation.

Each holding member 44 is formed as shown in Figs. 1, 2, 8, 9, and 10, it being substantially L-shaped, having a horizontal arm 45 and a vertical leg which has a lug 46 bent to the left from the side thereof, and a lug 47 bent to the right from the opposite side. The horizontal arm 45 cooperates with a restoring bail 48. The bottom of holding member 44 is formed with an extending foot 50 and is adapted to cooperate with a lug 51 formed on a sector locking member 53. The locking member is pivotally mounted on shaft 52 and cooperates with a pin 54 on the sector 20 to hold it from rotation when held down by the foot 50 (see Fig. 9).

Figure 2:
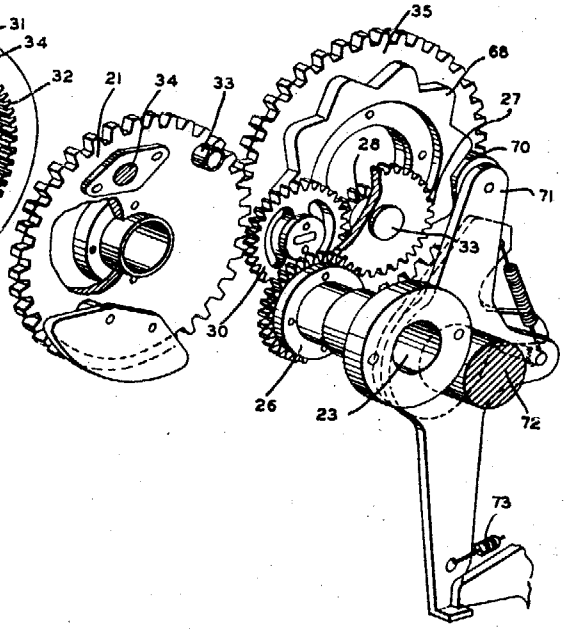
Fig. 2 is an exploded isometric view of the accumulator spur gearing showing the relationship of the accumulator gears and wheels of the planetary transmission for effecting the carry of the tens.
Figure 3:
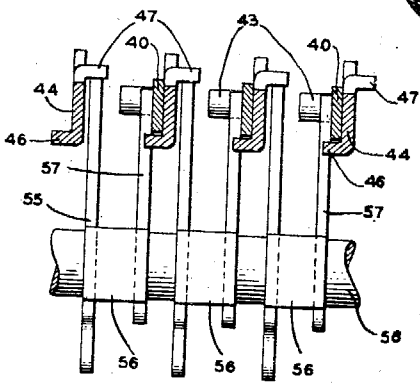
Fig. 3 is a plan view of three latch units showing some parts in section.
Figure 4:
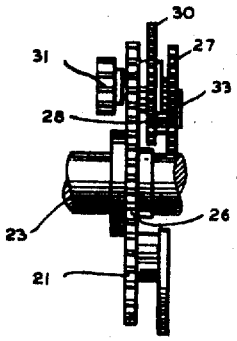
Fig. 4 is a detail view in elevation showing the mounting of the planetary gearing comprising the carry mechanism on the accumulator gearing.
Figure 5:
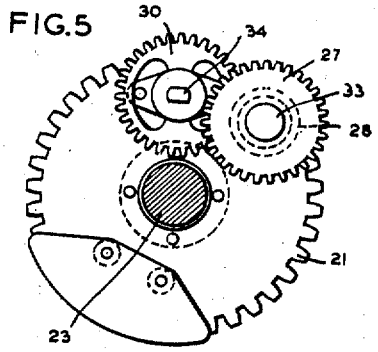
Fig. 5 is a side view of Fig. 4 disclosing one of the accumulator gears and its associated planetary gears mounted thereon.
Figure 6:
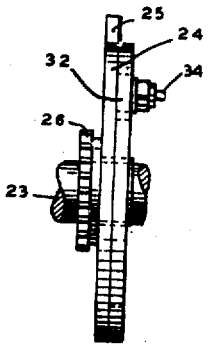
Fig. 6 is a front view in elevation of one of the accumulator wheels showing the orbit gear of the planetary train fastened thereto and the sun gear associated with the next higher order likewise fastened to the wheel.
Figure 7:
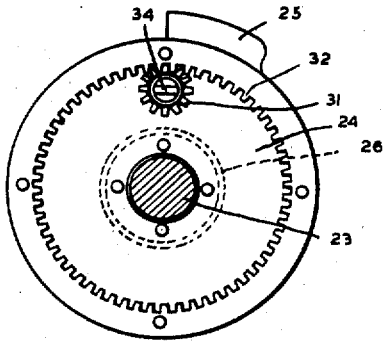
Fig. 7 is a side view of Fig. 6 disclosing the gearing in greater detail.
Figure 9:
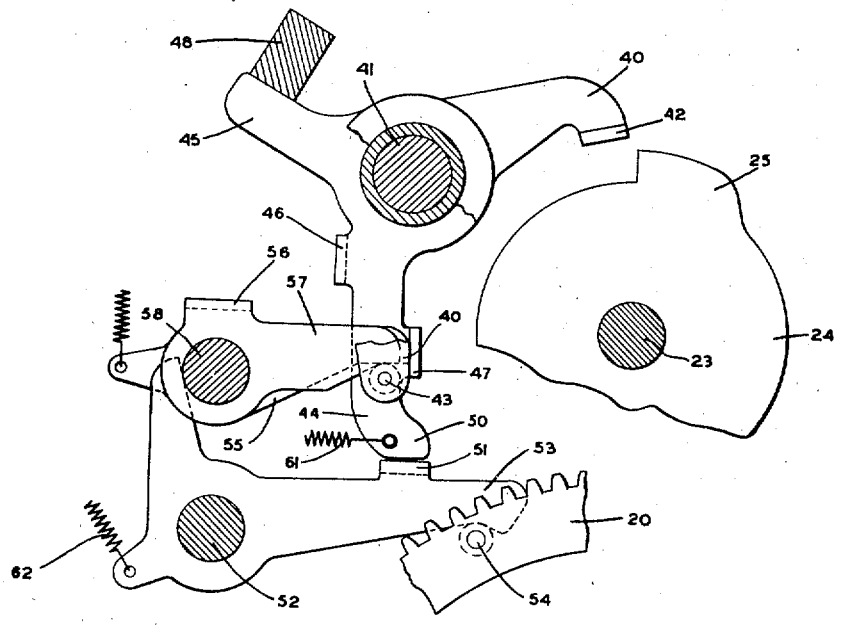
Fig. 9 is a side detail view showing the stop arm in elevated position together with the accumulator wheel, holding member, and sector locking member.
Figure 10:
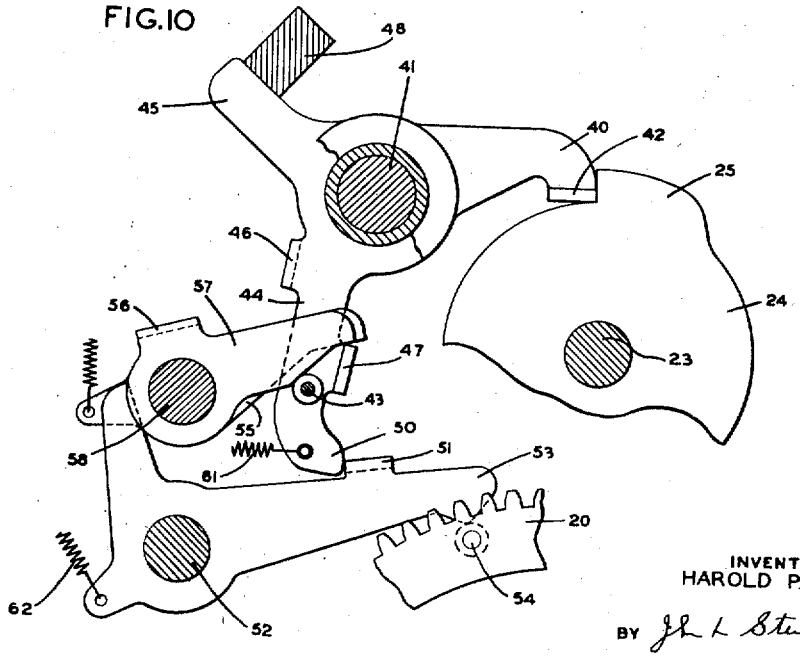
Fig. 10 is another detail view similar to Fig. 9 except that the parts are shown in another position of operation.

Lug 46 lies in front of the vertical leg of arm 40 so that when the holding member 44 is in its normal position (as shown in Figs. 2 and 9) the arm 40 is held against clockwise rotation or out of the path of the associated zero stop 25.

The lug 47 (Fig. 9) is positioned in front of the end of the left-hand arm 55 of latch 56. The foot 50, when in normal position lies directly above lug 51 on sector locking member 53, thereby preventing the release and subsequent operation of the sector 20 by the spring tension applied thereto.

Release latch 56, as shown in Fig. 1, is a U-shaped piece having arms 55 and 57 integral with each side of the U, and having a lug on one side to which a spring is attached. The latches 56 are pivoted on a rod 58 extending between the side frames, the rod being so located that, when the release latches are in normal position (Fig. 9), the rearward end of the left-hand arm 55 abuts the right-hand lug 47 on holding member 44 of an accumulator unit, while the horizontal portion of the cam surface on the right-hand arm lies above the stud 43 on the arm 40 associated with the accumulator unit of lower order.

When a total is to be taken the toothed elements, in the present instance the toothed sectors 20, are caused to be meshed with the accumulator gears 21, while being held against rotation by a restoring bail not shown. When in mesh they are held by studs 54 thereon positioned in notches in locking members 53.

At this time the bar or bail 48 is raised by a link 60 (Fig. 1) which is operated by a cam (not shown) in the base of the machine and all the holding members 44 are released for clockwise rotation in so far as control by the bail is concerned. The members 40 and 44 are now under control of the U-shaped release latches 56.

However, only the lowest order holding member is free to move at this time for it is the only one not blocked by a release latch 56.

When released, the holding member 44 is rotated in a clockwise direction by a spring 61 (Figs. 2 and 8) stretched between a stud and an anchor bar (not shown).

Thus, when upon taking a total the bail 48 is raised, the units holding member 44 rotates, and the foot 50 thereon moves off the lug 51 on locking member 53. Although member 53 is still urged downwardly (due to a spring 62 stretched between a forward extension thereof and an anchor bar) a strong spring (not shown) tends to rotate the sector 20 clockwise and consequently the stud 54 cams the locking member 53 upwardly and the sector is free to rotate. If the associated accumulator wheel 24 at this time lies in any position other than that representative of "9," the arm 40 (which is urged clockwise by a spring 63 stretched between stud 43 and an anchor bar) immediately moves clockwise until the lug 42 thereon rests on the periphery of the accumulator wheel 24. If, however, the wheel should be in the "9" position, the lug strikes the top portion of stop 25 thereby preventing the complete oscillation of stop arm 40 until the lug 25 has been rotated so that the wheel 24 reaches the "8" position.

When the arm 40 rotates (see Figs. 9 and 10) the stud 43 thereon strikes the camming surface on right-hand arm 57 of release latch 56, causing it to rise and the rearward end of its left-hand arm 55 is removed from the path of the lug 47 on the holding member 44 of the next higher denominational order. This second holding member rotates clockwise and releases the associated arm 40 and sector locking member 53 of the adjacent higher order. Again the stop arm 40 moves, immediately if the wheel stands at a position other than nine (and after a slight delay if at nine position), and, when it moves, sets up a similar train of operations to release the next adjacent higher order wheel and stop arm. This action continues from one accumulator unit to another until all wheels are released.

It will be seen from the above that, if the accumulator wheels of lower denominational orders have therein digits greater than those in the wheels of higher denominational orders, then the wheels of higher orders may reach their zero positions first.

In some crawl and carry mechanisms, embodying the eccentric transmission, such operation would be fatal because the higher denominational order wheels once positioned could not be corrected, and, since they would be positioned before the creep from the lower denominational order wheels was taken out, their final reading or positioning would be incorrect.

Due to the planetary spur gear arrangement the present device is operative under conditions such as set forth. If a wheel of higher denominational order reaches its zero position before those of lower denominational orders, then, as the lower order wheels come to their zero positions, they cause readjustment of the accumulator gear and sector of the higher order unit.

If, for example, the units order wheel has in it a digit of greater value than that in the tens order wheel, then, after both have been released, the tens order wheel will reach its zero position first. In moving to its zero position the tens order wheel will permit the sector (or other toothed element) associated therewith to move too far and the sector will be incorrectly positioned.

As the units order wheel continues to move towards its zero position, the sun gear 26 of the tens order unit is carried therewith. As the sun gear rotates it also rotates the step-down gearing, comprising planetary gears 27, 28, 30, and 31 with it, the gears 26 and 31 both rotating counterclockwise. Since the orbit gear 32 is prevented from rotating, due to the fact that stop 25 is against the stop arm 40, the accumulator gear 21 is forced to move clockwise and in so moving forces the sector 20 of the tens order to be readjusted to the proper position.

Let it be assumed, now, that the numbers "80" and "139" are inserted in the accumulator wheels in two successive accumulating operations, giving a total of "269."

After the first accumulating cycle the units order wheel stands at zero, the tens order wheel at "8" (0.8 of a turn), etc.

After the second accumulating cycle the units order wheel stands at "9" (0.9 of a turn), the tens order wheel at "6.9" (0.69 of a turn, since it stood at 0.8 and had added to it 0.8 and 0.09), and the hundreds order wheel at "2.69" (0.269 of a turn—it stood at 0.08 of a turn and had added to it 0.1 turn carry from the tens order plus 0.08 of a turn also carry from the tens order and 0.009 of a turn carry from the units order).

The units, tens, and hundreds order wheels thus stand at "9," "6.9," and "2.69," respectively.

If a total is now initiated, or, more exactly, if the bail 48 is raised, the arm 40 of the units order will be released for clockwise rotation (see Figs. 9 and 10), but, since the lug 25 is in the "9" position, the lug 42 will strike its periphery and the arm will be prevented from moving. However, bail 48 also released holding member 44 and thus caused the release of the sector 20 of the units order.

When the sector has moved through one unit space, the wheel of the units order will also have moved through one unit space and will lie at "8," the tens wheel at "6.8," and the hundreds wheel at "2.68."

Although the wheels 24 of the tens and hundreds order are free to move, the corresponding sectors 20 are held by their locking members 53. All the movements of these wheels are caused by the planetary gearing of the units carry mechanism.

When the units wheel reaches "8," the arm 40 associated therewith drops, since the lug 25 has passed by. This movement of the units arm 40, by stud 43 cams arm 57 upward and raises arm 55 out of the path of lug 47 of the tens holding member 44, permitting it to rotate clockwise and release the tens order sector 20. The arm 40 of the tens order immediately moves and releases the hundreds order sector. At this time the units order sector will have moved one unit space while other sectors will not have moved.

Assuming, for convenience, that the sectors of the tens and hundreds order are released simultaneously and that this release is at the moment when the units order wheel reaches its "8" position, then it is obvious that the hundreds order wheel will reach its zero position before either the tens or units order wheels.

The movement of the hundreds order wheel toward its zero stop is comprised of movement transmitted from its own sector and gear and movement transmitted from the gears and sectors of lower orders. These movements may be computed since the gear ratios are known, the movement, of course, is in a subtractive direction bringing the stops 25 towards the stop arms 40 rather than away from them as in adding cycles.

If, now, we assume that all sectors move at the same speed and, consequently, the same amount in a given time (this is a probable condition for the springs, the friction, etc., of the various units are substantially equal) then the movement of the sectors 20, or equivalent toothed elements, may be taken as the same for all and equal to X.

Now X units of movement of a sector cause X units of movement of the corresponding accumulator wheel, $$\frac{X}{10}$$

units of movement of the next higher order wheel and $$\frac{X}{100}$$

units of movement of the second higher order wheel. Then, the units of movement of the wheel of the hundreds order, to bring it to "0," namely, 2.68 equals the movement of its own sector, or X plus $$\frac{1}{10}$$

of the movement of the tens order sector, or $$\frac{X}{10}$$

plus $$\frac{1}{100}$$

of the movement of the units order sector, or $$\frac{X}{100}$$

Then $$\frac{111X}{100}=2.68$$

Solving this equation, we find $X=2.414$. This is the number of units of movement by the sectors to bring the hundreds order wheel to zero. Checking this to ascertain if the hundreds order wheel truly stands at "0," we find that the wheel has moved 2.414 plus .2414 plus .02414 or 2.680 which, subtracted from 2.68, =0.

Now, the tens order wheel at this time will have moved 2.414 plus .2414, or 2.655. Since it stood at 6.8 it now stands at 6.800 minus 2.655 or 4.145.

At the same time the units order wheel will have moved 2.414 and since it stood at 8.000, will now stand at 8.000 minus 2.414 or 5.586.

Also, at this time the hundreds, tens, and units sectors will have moved from their zero positions, respectively, 2.414, 2.414, and 3.414 units. It will be remembered that the units wheel moved one unit to clear the stop arm and start the totaling operation.

Now the tens and units order wheels will continue to rotate and after the tens order wheel has rotated through 4.145 unit spaces it will come to rest with its stop against the stop arm. In order that the wheel rotate through 4.145 units the tens and units sectors must move X unit spaces. Now, $$X \text{ plus } \frac{X}{10}=4.145$$

and, therefore, $X=3.768$.

Again checking, we find that the tens order wheel rotates 3.768 plus 0.3768 or 4.145 units bringing it to zero. The units order wheel will have rotated 3.768 units and will now stand at 5.586 minus 3.768 or 1.818 units from zero.

As the tens order wheel rotated to zero it rotated the hundreds order sun gear 26 with it (counter-clockwise as seen in Fig. 2), and this tended to rotate the hundreds order orbit gear 32 counter-clockwise. But the stop 25 being already against the stop arm, the orbit gear could not move counter-clockwise and consequently the accumulator gear 21 was caused to move in the opposite direction (clockwise) one-ninth as many times as the sun gear or .0460 turn. Now, each one-ninth of a turn of the gear 21 represents a unit and consequently the gear 21 and its associated sector 20 will have moved nine times 0.0460 unit or 0.414 unit.

In order to show clearly that, when an accumulator wheel 34 has reached its zero stop arm, the correction of the associated accumulator gear 21 by the accumulator wheel 24 of the next lower order is one-ninth of the movement of the latter wheel, the following explanation is given:

The sun gear 26 will move as many fractions of a turn as does the wheel of next lower order since the sun gear is fastened to that wheel. Then the pinion 31 of the higher order tends to rotate the orbit gear 32 of that order one-tenth the number of turns of the sun gear. But the orbit gear 32 of the higher order cannot rotate counter-clockwise since the stop 25 thereon is against the stop arm and consequently the accumulator gear 21 of the higher order might be said to rotate clockwise one-tenth the number of turns of the wheel of lower order. In so doing the accumulator gear carries the planet gear 27 with it, causing the gear to roll on the adjacent sun gear, and thus tending to move the orbit gear again, this time, one one-hundredth the number of turns of the lower order accumulator wheel. Again this results in rotating the higher order accumulator gear clockwise and in rolling the planet gear 27 on the sun gear 26. Now the planet gears 30 and 31 again tend to rotate the orbit gear and to again rotate the accumulator gear, this time, of course, one one-thousandths the number of turns of the sun gear; and this action continues until all have reached normal.

Now the accumulator gear will have moved one-tenth, plus one-hundredths, plus one-thousandths, plus, etc., or will have moved a number of turns represented by the repeating decimal .1111 – – –; this repeating decimal equals one-ninth and thus it is seen that the movement of the higher order accumulator gear is one-ninth that of the lower order accumulator wheel.

Now the sector moves with the accumulator gear and, since it stood at 2.414 and has just moved 0.414 toward 0, it now stands at 2.000 which is correct.

At this time, the hundreds and tens wheels are at 0 and the units wheel 1.818 units from 0, also at this time the sectors stand 2, 6.182 (2.414 plus 3.768), and 7.182 (3.414 plus 3.768) units from zero.

The units accumulator wheel is now 9 minus 7.182 or 1.818 units from 0.

To rotate it this amount, its sector must move this amount. In moving 1.818 units the unit wheel is brought against the zero stop. Also the sun gear of the tens order rotates 1.818 units counter-clockwise and tends to rotate the orbit gear of that order counter-clockwise 0.1818 units. Since this is prevented, due to the stop lying against the stop arm, the gear 21 rotates 0.1818 (.00202 turn) clockwise and thus the tens sector 20 is moved .1818 unit toward 0. Now, the tens sector stood at 6.182 and this minus .1818 equals 6.00 which correctly positions the sector.

The units order sector has moved one unit plus 2.414 units plus 3.768 units plus 1.818 units and is, therefore, positioned at 9, which is correct.

As has been stated above, the recording means which punches or prints the total derived from the accumulator wheels 21 may be of any convenient construction and is not a part of this invention. Fig. 1 indicates one way in which such a means may be constructed. The sectors 20 which are meshed with the accumulator gears 21 just prior to total taking, position racks 22, said racks cooperating with smaller gears 64 attached to the sectors 20. A disc 65 and a shroud plate 66 hold the gear and rack in proper spaced relation. At one end of the rack 22 a ratchet bar 67 is attached for positioning a plurality of recording devices not shown in the drawings. These bars 22, 67 may serve as a conventional illustration of a total recording mechanism.

It is quite necessary that the total taking or zeroizing mechanism be shifted in and out of mesh with the accumulator gears when the operating phases are changed from accumulating to total taking and back again. It is also necessary to disengage the driving mechanism at some point so that a total may be rolled out of the accumulator easily and quickly. Since the driving means comprises a series of mechanical clutches which are normally disengaged, further disengaging means is not necessary.

Fig. 2 shows a driving gear 35 permanently meshed with the accumulator gear 21. A detent wheel 68 is secured to said driving gear in order to register the digit more accurately. A detent roller 70 is mounted on a lever 71, which, in turn, is rockably mounted on a shaft 72 and urged counter-clockwise by a spring 73. When a total is to be rolled out of the accumulator unit, all the detent levers (there is one for each drive gear) are pulled away from the detent wheels 68 by mechanism not shown in the drawings, but fully disclosed and described in the parent application. Such an action is not necessary to the successful operation of the device but the speed of total taking is increased and the operation is more quiet.

Figure 8:
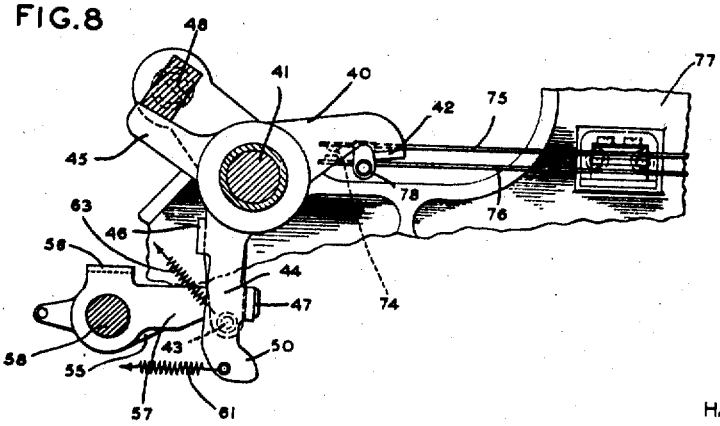
Fig. 8 is a side detail view with some parts in section showing an assembly of the stop arm, stop bail, release latch, and a pair of contacts cooperating with the stop arm of the highest denominational order accumulator unit.

Fig. 8 shows the stop arm 40 of the highest order accumulator together with its associated mechanisms. This stop arm is the last one to be operated and within a very short time after the arm 40 has descended the total taking operation is at an end and the machine is ready to change its phase of operation to either another accumulating cycle or else a printing or punching phase.

To initiate the new phase of operations a pair of contacts 74 is positioned to the left of the highest order stop arm attached to spring arms 75 and 76 and secured by the usual insulating means to the left side frame 77. A lug 78 is attached to the upper spring arm 75 in such manner that it projects under the stop arm 40 and is engaged by it when the stop arm is lowered.

The contacts 74 may initiate a new phase of operations in a number of ways such as by relays, magnetic clutches or solenoid operated gear change devices. These are not shown and do not form a part of the present invention.

It will be perceived that the arm or lever 40 with its lug 42, and the lug 25 on the accumulator wheel 24 in cooperation, have two different functions and constitute two distinct means notwithstanding the fact that, in the instance of the invention shown in the drawings, it was found convenient and advantageous to embody these two means in the same integral pieces of metal. It is only the radial edge of lug 25 and the rear edge of lug 42 that stop the wheel; and it is only the under surface of lug 42 riding on the peripheral edge of the lug 25 (which is elongated for the purpose) that serves to delay the operation of the next higher wheel. When the lug 42 is arrested by the lug 25, and subsequently descends to the low part of the wheel 24, thus first delaying and then effecting the release of the next higher order, these parts are performing a control or timing function quite independent of the stopping function afterward performed by other portions of the same lugs. One part of this control or timing function is to prevent the descent of the lug 42 of next higher order, considered as a stop lug, into engaging position prematurely. The arm 40 as illustrated may be characterized as a combined control and stop arm.

It will also be perceived that when consecutive wheels register nines, the precise point at which the lug 25 of a lower wheel lets the lug 42 descend to the low part of the wheel 24, is not critical, except that the arm 40 must be held up long enough to insure that enough of the creep will first have been removed from the next higher order wheel to bring the lug 25 of that wheel safely under its lug 42. In the instance illustrated in the drawings, the arm 40 makes its descent at about the point, or a little before the point, where the wheel is in its eight position. In this instance, the arm 40 when first released from the latch 56, might find its wheel 24 anywhere from its theoretical position 9.8 to, say, 8.2; but in another instance it might be anywhere from 9.7 to 7, for example. In some of the claims this indefinite point is expressed as "approximately 9."

While I have described what I consider to be a highly desirable embodiment of my invention, it is obvious that may changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In normalizing control mechanism for an accumulator of the crawl carry type, which accumulator comprises in each denomination an accumulator gear, an accumulator wheel and differential gearing, the combination of locks for the sectors which return the wheels to zero, stops for the accumulator wheels, control members one cooperating with each accumulator wheel, latches to maintain said stops and control members out of engaging position and said locks in locking condition in all orders except the lowest, lugs on said accumulator wheels to restrain said control members and stops each when released from its latch and when the associate accumulator wheel stands approximately at nine, and means controlled by each said control member when freed from its latch and from its said lug to trip the latch for the next higher order.

2. In a crawl-carry accumulator and zeroizing mechanism therefor, the combination of an accumulator wheel for each denominational order having a high part and a low part, a control member and a zero stop cooperating with each said wheel, said control member being adapted to be held by said high part during a portion of the return rotation of said wheel, a spring operated restoring sector for each denomination, a lock for each said sector, release latches one controlling the lock, control member and stop for each order above the lowest, and means controlled by the control member in each order when said member descends to the low part of its associate wheel to trip the release latch for the next higher order.

3. In a computing machine having an accumulator of the crawl carry type including numeral wheels and resultant wheels, and sectors to restore said wheels to zero position, zeroizing control mechanism comprising in combination control arms, one controlled by the resultant wheel of each order; each resultant wheel having a high part and a low part, said high part being adapted to hold up its associate control arm when the resultant wheel stands approximately at nine, locks for the sectors, and release latches initially holding said control arms against descending and holding said locks in locking condition, and means controlled by a control arm when it descends to the low part of its associate resultant wheel to trip the release latch for the control arm and the lock of next higher order.

HAROLD P. MIXER.